United States Patent Office

3,518,224
Patented June 30, 1970

---

3,518,224
STABILIZATION OF HALOGENATED VINYL RESINS
Heinz Eggensperger, Gadernheim, over Bensheim, Volker Franzen, Heidelberg, and Hans Stephan, Bensheim, Bergstrasse, Germany, assignors to Deutsche Advance Produktion G.m.b.H., Lautern, Odenwald, Germany, a corporation of Germany
No Drawing. Original application Oct. 20, 1965, Ser. No. 499,015, now Patent No. 3,412,139, dated Nov. 19, 1968. Divided and this application June 26, 1968, Ser. No. 752,419
Claims priority, application Germany, Dec. 2, 1964, D 45,968
Int. Cl. C08f 45/60
U.S. Cl. 260—45.85    10 Claims

---

ABSTRACT OF THE DISCLOSURE

Halogenated vinyl resin compositions containing esters of aminocrotonic or 2-aminocyclohexene carboxylic acid having at least one thioether group in the ester radical exhibit improved stability and compatibility with plasticizers.

---

This application is a division of our co-pending application, Ser. No. 499,015, filed Oct. 20, 1965, now U.S. Pat. No. 3,412,139.

This invention relates to new compositions of matter and to halogen-containing hydrocarbon resin compositions stabilized therewith.

It is well known that halogen-containing hydrocarbon resins deteriorate when exposed to heat and light and require the addition of stabilizers. The stabilizers used for this purpose may be divided in several groups, one of said groups being organic nitrogen compounds.

Such organic nitrogen compounds proposed as stabilizers include, for instance, diphenylthiourea, phenyl indol, and esters of beta-aminocrotonic acid with saturated aliphatic alcohols and polyols. Said stabilizers have, however, certain drawbacks. The stabilizing effect of diphenyl thiourea is not sufficient for most practical applications. Resins stabilized with phenylindol are rather light sensitive, and the beta-aminocrotonic acid esters are incompatible with plasticized resins. All said stabilizers are insufficiently effective for vinyl chloride polymers obtained by suspension polymerization.

We have now discovered a new group of organic nitrogen containing compounds which avoid the drawbacks of the formerly used nitrogen compounds and are, in particular, excellent stabilizers for suspension polymers of vinyl chloride. Said compounds are alpha, beta-unsaturated beta-aminocarboxylic acid esters of the general formula (1) 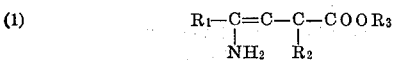

wherein $R_1$ and $R_2$ are each hydrogen or hydrocarbon groups and $R_3$ is hydrocarbon containing at least one thioether group. The hyrocarbon groups may be aliphatic saturated or unsaturated straight or branched chains or substituted or unsubstituted aromatic groups. $R_1$ and $R_2$ may form together a ring. Preferably, we use beta-aminocrotonates in which the ester group contains a thioether group.

The improved effect of the new stabilizers is probably due to the combined action of the amino group as HCl acceptor, of the $NH_2$—$C$=$C$ group as readily alkylated system, and of the thioether group as retarding the oxydative degradation of the polymer. At the same time, the compatibility wih plasticizer contained polyvinyl chloride is improved. Addition of phenols increases said inhibitor effect.

Though the compounds can be used alone as stabilizers in amounts of 0.2 to 3, preferably about 2 percent, calculated on the weight of the resin, they are of particular advantage in combination with other stabilizers, such as metal soaps, e.g. salts of carboxylic acids having 6 to 20 carbon atoms with bivalent metals, alone or in further mixture with polyols such as pentaerythritol, dipentaerythritol, and sorbitol. Such stabilizer systems in which up to 50% of the normally used metal salt-polyol combination is replaced by our new stabilizer, are particularly useful for preventing "early color" in the processing of suspension polyvinyl chloride resins. The partial replacement of the metal salt stabilizer by the new ester compounds lowers considerably the melt viscosity of rigid polyvinyl chloride and increases the dynamic stability in extruders and the like.

Resins which can be stabilized with the thioether compounds of the invention are essentially polyvinyl chloride and polyvinylidene chloride, and resins obtained by copolymerization of vinyl chloride and/or vinylidene chloride with each other and/or with other copolymerizable ethylenically unsaturated compounds. An illustrative list of such resins is given in Pat. No. 2,592,926.

The stabilizers can be prepared by reaction of thioether groups containing beta-acetocarboxylic acid esters with ammonia under a pressure of about 0.5 to 3 atmospheres above atmospheric pressure and at a temperature of about 60 to 70° C. in the presence of water or a water-miscible solvent, or also as a melt reaction in the absence of solvents. The reaction products, when washed repeatedly with methanol, are the pure esters of the corresponding beta-amino-alpha, beta-unsaturated carboxylic acids where the ester group contains the thioether group. The starting beta-acetocarboxylic acid esters which contain the thioether group are obtained by transesterification of acetoacetic acid or corresponding higher acid esters (preferably the methyl ester) with the respective thioalcohol.

The following examples are given to illustrate the invention. All parts are given by weight unless otherwise specified.

EXAMPLE 1

1 mol of thiodiethylene glycol was heated with 4 moles of acetoacetic acid methyl ester at 140–160° C. and the split off methanol was distilled off first at atmospheric pressure and subsequently at 100 torr. The excess acetoacetic acid ester was distilled off at 10 torr.

The obtained ester was then reacted with ammonia. After washing with methanol, the obtained product was pure thio diethylene glycol bis-(beta-aminocrotenate) of the formula

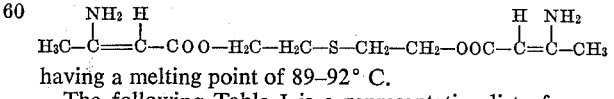

having a melting point of 89–92° C.

The following Table I is a representative list of compounds prepared by reaction of acetoacetic acid with the respective thioether-alcohols.

TABLE I

| Stabilizer Number | Compound | | b or m in ° C. |
|---|---|---|---|
| I | Y—CH₂—CH₂—S—C₂H₅ | b₀.₀₁ | 110–118 |
| II | Y—CH₂—CH₂—S—C₁₂H₂₅ | m | 37–39 |
| III | Y—CH₂—CH₂—S—CH₂—CH₂—OH | m | 89–92 |
| IV | Y—CH₂—CH₂—S—CH₂—CH₂—Y | m | 89–92 |
| V | Y—(CH₂)₂—S—CH₂—S—(CH₂)₂—Y | m | 84–85 |
| VI | Y—(CH₂)₂—S—(CH₂)₂—S—(CH₂)₂—Y | m | 126–130 |
| VII | Y—(CH₂)₂—S—(CH₂)₆—S—(CH₂)₂—Y | m | 95–98 |
| VIII | Y—(CH₂)₂—S—(CH₂)₂—O—(CH₂)₂—S—(CH₂)₂—Y | m | 48–51 |
| IX | Y—(CH₂)₂—S—CH₂—CH=CH—CH₂—S—(CH₂)₂—Y | m | 124–125 |
| X | (cyclohexenyl-amino-diester structure) —COOCH₂CH₂—S—CH₂CH₂—OOC— | m | 98–101 |

See the following note:

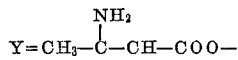

EXAMPLE 2

The basic resin formulation used for the stabilizer tests was a polyvinyl chloride obtained by suspension polymerization and having the K value 64.

100 parts of said stock were mixed with 2 parts of the stabilizer on a 2-roll heated mill at 180° C. for 5 minutes according to the conventional procedure to sheets of 0.3 mm. thickness. Samples of the sheets were suspended at a temperature of 160° C. in a forced air convection oven from which the samples were removed after 0, 15, 45, and 60 minutes for observation of the discoloration.

The stabilizers used and the results of the heating tests are shown in the following table, where the stabilizers of the invention are designated by the numbers of Table I.

Composition B

Suspension polyvinyl chloride K=70 _____ 70
Dioctyl phthalate plasticizer _____ 30
Diethyleneglycol-bis-(beta-aminocrotonate) _____ 2

The compositions A and B were milled under the same conditions at 165° C. for 5 minutes and sheeted off to sheets of 1.1 mm. thickness. Said sheets were piled up and pressed for 1 minute at 180° C. and a pressure of 200 atm. to plates of 18.5 cm. length, 9 cm. width, and 1 mm. thickness. The composition B furnished a plate whose surface showed a dusty coating of sweat out stabilizer. Composition A furnished a transparent plate on which even after prolonged storage no coating could be observed.

TABLE II

| Stabilizer | On conclusion of milling | Color of Product After— 15 minutes at 160° C. | 45 minutes at 160° C. | 60 minutes at 160° C. |
|---|---|---|---|---|
| Diphenylthiourea | Brown | Black red | Black | Black. |
| α-Phenylindol | do | Brown | Brown | Dark brown. |
| Beta-aminocrotonic acid octylester | Yellow | Yellow | Dark brown | Black. |
| 1,4-butanediol-bis-beta-aminocrotonate | Light yellow | do | Brown | Black red. |
| Diethyleneglycol bis-beta-aminocrotonate | do | do | do | Do. |
| IV | Colorless | Light yellow | Yellow | Brown. |
| 90% IV+10% 2,6-di-tert. butyl-p-cresol | do | Colorless | Light yellow | Yellow. |
| VI | do | Light yellow | Yellow | Brown. |
| 90% VI+10% 2,6-di-tert. butyl-p-cresol | do | Colorelss | Light yellow | Yellow. |

The stabilizers I–III, and V–X had essentially the same effect as IV and VI.

EXAMPLE 3

This example is given to show that the thioether compounds of the invention were better compatible with plasticized polyvinyl chloride resin than the corresponding sulfur free beta amino crotonates.

The following compositions were compared:

Composition A
Components                                         Parts
Suspension polyvinyl chloride K=70 _____ 70
Dioctyl phthalate plasticizer _____ 30
Stabilizer IV thiodiethyleneglycol-bis (beta-aminocrotonate) _____ 2

We claim:
1. A composition of matter comprising a halogenated vinyl resin and from 0.2 to 3 percent by weight of said resin of an amino acid sulfur compound of the formula

$$Y—C_2H_4S—[B]_a—(CH_2)_b—A$$

wherein Y is an amino carboxylic acid radical selected from the group consisting of

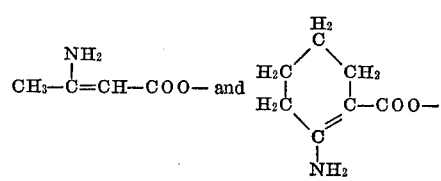

B is a member of the group consisting of $(CH_2)_nX$ and $CH_2-CH=CH-CH_2X$, X being a member of the group consisting of sulfur and oxygen, $n$ being an integer from 1 to 6, $a$ being an integer from 0 to 2, $b$ being an integer from 2 to 12 and A is a member of the group consisting of H, OH and Y as a stabilizer.

2. A composition as claimed in claim 1 containing in addition, at least one additional stabilizer selected from the groups consisting of phenols, polyols, and metal soaps.

3. A composition according to claim 1 wherein Y is

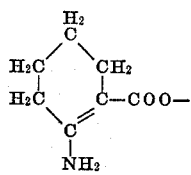

4. The composition according to claim 1 wherein Y is

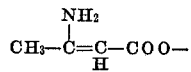

and X is sulfur.

5. The composition of claim 1 wherein said resin is polyvinyl chloride.

6. The composition of claim 2 wherein said resin is polyvinyl chloride.

7. The composition of claim 3 wherein said resin is polyvinyl chloride.

8. The composition of claim 4 wherein said resin is polyvinyl chloride.

9. A composition of matter comprising a halogenated vinyl resin and from 0.2 to 3 percent by weight of said resin of a bis (amino acid) sulfur compound corresponding to the formula

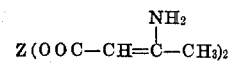

wherein Z is a glycol radical containing 1 or 2 thioalkylene groups as a stabilizer.

10. The composition of claim 9 wherein said resin is polyvinyl chloride.

References Cited

UNITED STATES PATENTS

| | | | |
|---|---|---|---|
| 2,476,422 | 7/1949 | Leninger | 260—45.75 |
| 2,592,926 | 4/1952 | Mack et al. | 260—45.75 |
| 2,666,752 | 1/1954 | Grummitt et al. | 260—23 |
| 3,236,805 | 2/1966 | Caldo | 260—45.85 |
| 3,249,584 | 5/1966 | Gasparis | 260—45.85 |
| 3,280,058 | 10/1966 | Caldo | 260—23 |

DONALD F. CZAJA, Primary Examiner

P. HOKE, Assistant Examiner

U.S. Cl. X.R.

260—23, 31.8, 45.95